United States Patent
Batra et al.

(10) Patent No.: US 7,257,151 B2
(45) Date of Patent: Aug. 14, 2007

(54) (UPDATED) PREAMBLE FOR FDMA

(75) Inventors: Anuj Batra, Dallas, TX (US);
Jaiganesh Balakrishnan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 132 days.

(21) Appl. No.: 11/021,609

(22) Filed: Dec. 23, 2004

(65) Prior Publication Data
US 2005/0249268 A1 Nov. 10, 2005

Related U.S. Application Data

(60) Provisional application No. 60/568,715, filed on May 5, 2004.

(51) Int. Cl.
*H04B 1/00* (2006.01)
(52) U.S. Cl. ...................................... 375/147
(58) Field of Classification Search ............. 375/130, 375/136, 150, 147; 370/208, 335, 331, 332, 370/341
See application file for complete search history.

(56) References Cited

U.S. PATENT DOCUMENTS

| | | | |
|---|---|---|---|
| 6,222,875 B1 * | 4/2001 | Dahlman et al. ........... 375/130 |
| 6,370,130 B1 * | 4/2002 | Zhou et al. ................. 370/335 |
| 6,597,676 B1 * | 7/2003 | Ariyoshi et al. ............ 370/335 |
| 6,693,890 B1 * | 2/2004 | Yick et al. .................. 370/342 |
| 2002/0034215 A1 * | 3/2002 | Inoue et al. ................ 375/147 |
| 2003/0072255 A1 * | 4/2003 | Ma et al. .................... 370/208 |
| 2003/0077225 A1 | 4/2003 | Ma et al. |
| 2004/0052306 A1 * | 3/2004 | Ibrahim et al. ............. 375/152 |
| 2004/0240527 A1 * | 12/2004 | Giannakis et al. .......... 375/138 |
| 2005/0068932 A1 * | 3/2005 | Lakkis ....................... 370/347 |
| 2005/0180376 A1 * | 8/2005 | Chander et al. ............ 370/344 |

* cited by examiner

*Primary Examiner*—Emmanuel Bayard
(74) *Attorney, Agent, or Firm*—Steven A. Shaw; W. James Brady; Frederick J. Telecky, Jr.

(57) ABSTRACT

A wireless device (10, 12) is provided that distinguishes between multiple piconets. The wireless device (10, 12) includes a preamble component (160, 162, 164, 166) and a correlator (150) component. The preamble component (160, 162, 164, 166) provides a preamble (120) for a wireless fixed frequency interleaving transmission, and the correlator component (150) distinguishes a wireless transmission based on the preamble (120). A circuit (180) is provided for a wireless receiver to despread a hierarchical sequence (120) made by spreading an M-length sequence (110) with an N-length sequence (112). The circuit (180) includes a first and second despreaders (185, 190). The first despreader (185) is coupled to a signal input to despread a received signal. The signal is a fixed frequency interleaved transmission. The second despreader (190) is coupled to an output of the first despreader (185). The second despreader (190) despreads the output of the first despreader (185) with a second sequence.

20 Claims, 6 Drawing Sheets

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $c_1$ | 1 | $c_{33}$ | 1 | $c_{65}$ | 1 | $c_{97}$ | -1 |
| $c_2$ | 1 | $c_{34}$ | 1 | $c_{66}$ | 1 | $c_{98}$ | -1 |
| $c_3$ | 1 | $c_{35}$ | 1 | $c_{67}$ | 1 | $c_{99}$ | -1 |
| $c_4$ | -1 | $c_{36}$ | -1 | $c_{68}$ | -1 | $c_{100}$ | 1 |
| $c_5$ | -1 | $c_{37}$ | -1 | $c_{69}$ | -1 | $c_{101}$ | 1 |
| $c_6$ | -1 | $c_{38}$ | -1 | $c_{70}$ | -1 | $c_{102}$ | 1 |
| $c_7$ | 1 | $c_{39}$ | 1 | $c_{71}$ | 1 | $c_{103}$ | -1 |
| $c_8$ | -1 | $c_{40}$ | -1 | $c_{72}$ | -1 | $c_{104}$ | 1 |
| $c_9$ | 1 | $c_{41}$ | 1 | $c_{73}$ | -1 | $c_{105}$ | 1 |
| $c_{10}$ | 1 | $c_{42}$ | 1 | $c_{74}$ | -1 | $c_{106}$ | 1 |
| $c_{11}$ | 1 | $c_{43}$ | 1 | $c_{75}$ | -1 | $c_{107}$ | 1 |
| $c_{12}$ | -1 | $c_{44}$ | -1 | $c_{76}$ | 1 | $c_{108}$ | -1 |
| $c_{13}$ | -1 | $c_{45}$ | -1 | $c_{77}$ | 1 | $c_{109}$ | -1 |
| $c_{14}$ | -1 | $c_{46}$ | -1 | $c_{78}$ | 1 | $c_{110}$ | -1 |
| $c_{15}$ | 1 | $c_{47}$ | 1 | $c_{79}$ | -1 | $c_{111}$ | 1 |
| $c_{16}$ | -1 | $c_{48}$ | -1 | $c_{80}$ | 1 | $c_{112}$ | -1 |
| $c_{17}$ | 1 | $c_{49}$ | 1 | $c_{81}$ | 1 | $c_{113}$ | -1 |
| $c_{18}$ | 1 | $c_{50}$ | 1 | $c_{82}$ | 1 | $c_{114}$ | -1 |
| $c_{19}$ | 1 | $c_{51}$ | 1 | $c_{83}$ | 1 | $c_{115}$ | -1 |
| $c_{20}$ | -1 | $c_{52}$ | -1 | $c_{84}$ | -1 | $c_{116}$ | 1 |
| $c_{21}$ | -1 | $c_{53}$ | -1 | $c_{85}$ | -1 | $c_{117}$ | 1 |
| $c_{22}$ | -1 | $c_{54}$ | -1 | $c_{86}$ | -1 | $c_{118}$ | 1 |
| $c_{23}$ | 1 | $c_{55}$ | 1 | $c_{87}$ | 1 | $c_{119}$ | -1 |
| $c_{24}$ | -1 | $c_{56}$ | -1 | $c_{88}$ | -1 | $c_{120}$ | 1 |
| $c_{25}$ | -1 | $c_{57}$ | -1 | $c_{89}$ | 1 | $c_{121}$ | -1 |
| $c_{26}$ | -1 | $c_{58}$ | -1 | $c_{90}$ | 1 | $c_{122}$ | -1 |
| $c_{27}$ | -1 | $c_{59}$ | -1 | $c_{91}$ | 1 | $c_{123}$ | -1 |
| $c_{28}$ | 1 | $c_{60}$ | 1 | $c_{92}$ | -1 | $c_{124}$ | 1 |
| $c_{29}$ | 1 | $c_{61}$ | 1 | $c_{93}$ | -1 | $c_{125}$ | 1 |
| $c_{30}$ | 1 | $c_{62}$ | 1 | $c_{94}$ | -1 | $c_{126}$ | 1 |
| $c_{31}$ | -1 | $c_{63}$ | -1 | $c_{95}$ | 1 | $c_{127}$ | -1 |
| $c_{32}$ | 1 | $c_{64}$ | 1 | $c_{96}$ | -1 | $c_{128}$ | 1 |

*FIG. 3*

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $c'_1$ | 0.9574 | $c'_{33}$ | 0.8400 | $c'_{65}$ | 0.5859 | $c'_{97}$ | -0.8528 |
| $c'_2$ | 0.5270 | $c'_{34}$ | 1.3980 | $c'_{66}$ | 0.3053 | $c'_{98}$ | -0.6973 |
| $c'_3$ | 1.5929 | $c'_{35}$ | 1.1147 | $c'_{67}$ | 0.8948 | $c'_{99}$ | -1.2477 |
| $c'_4$ | -0.2500 | $c'_{36}$ | -0.4732 | $c'_{68}$ | -0.6744 | $c'_{100}$ | 0.6246 |
| $c'_5$ | -0.2536 | $c'_{37}$ | -1.7178 | $c'_{69}$ | -0.8901 | $c'_{101}$ | 0.7687 |
| $c'_6$ | -0.3023 | $c'_{38}$ | -0.8477 | $c'_{70}$ | -0.8133 | $c'_{102}$ | 0.7966 |
| $c'_7$ | 1.2907 | $c'_{39}$ | 1.5083 | $c'_{71}$ | 0.9201 | $c'_{103}$ | -1.2809 |
| $c'_8$ | -0.4258 | $c'_{40}$ | -1.4364 | $c'_{72}$ | -1.0841 | $c'_{104}$ | 1.1023 |
| $c'_9$ | 1.0012 | $c'_{41}$ | 0.3853 | $c'_{73}$ | -0.8036 | $c'_{105}$ | 0.4250 |
| $c'_{10}$ | 1.7704 | $c'_{42}$ | 1.5673 | $c'_{74}$ | -0.3105 | $c'_{106}$ | -0.1614 |
| $c'_{11}$ | 0.8593 | $c'_{43}$ | 0.0295 | $c'_{75}$ | -1.0514 | $c'_{107}$ | 0.7547 |
| $c'_{12}$ | -0.3719 | $c'_{44}$ | -0.4204 | $c'_{76}$ | 0.7644 | $c'_{108}$ | -0.6696 |
| $c'_{13}$ | -1.3465 | $c'_{45}$ | -1.4856 | $c'_{77}$ | 0.7301 | $c'_{109}$ | -0.3920 |
| $c'_{14}$ | -0.7419 | $c'_{46}$ | -0.8404 | $c'_{78}$ | 0.9788 | $c'_{110}$ | -0.7589 |
| $c'_{15}$ | 1.5350 | $c'_{47}$ | 1.0111 | $c'_{79}$ | -1.1305 | $c'_{111}$ | 0.6701 |
| $c'_{16}$ | -1.2800 | $c'_{48}$ | -1.4269 | $c'_{80}$ | 1.3257 | $c'_{112}$ | -0.9381 |
| $c'_{17}$ | 0.6955 | $c'_{49}$ | 0.3033 | $c'_{81}$ | 0.7801 | $c'_{113}$ | -0.7483 |
| $c'_{18}$ | 1.7204 | $c'_{50}$ | 0.7757 | $c'_{82}$ | 0.7867 | $c'_{114}$ | -0.9659 |
| $c'_{19}$ | 0.1643 | $c'_{51}$ | -0.1370 | $c'_{83}$ | 1.0996 | $c'_{115}$ | -0.9192 |
| $c'_{20}$ | -0.3347 | $c'_{52}$ | -0.5250 | $c'_{84}$ | -0.5623 | $c'_{116}$ | 0.3925 |
| $c'_{21}$ | -1.7244 | $c'_{53}$ | -1.1589 | $c'_{85}$ | -1.2227 | $c'_{117}$ | 1.2864 |
| $c'_{22}$ | -0.7447 | $c'_{54}$ | -0.8324 | $c'_{86}$ | -0.8223 | $c'_{118}$ | 0.6784 |
| $c'_{23}$ | 1.1141 | $c'_{55}$ | 0.6336 | $c'_{87}$ | 1.2074 | $c'_{119}$ | -1.0909 |
| $c'_{24}$ | -1.3541 | $c'_{56}$ | -1.2698 | $c'_{88}$ | -1.2338 | $c'_{120}$ | 1.1140 |
| $c'_{25}$ | -0.7293 | $c'_{57}$ | -0.7853 | $c'_{89}$ | 0.2957 | $c'_{121}$ | -0.6134 |
| $c'_{26}$ | 0.2682 | $c'_{58}$ | -0.7031 | $c'_{90}$ | 1.0999 | $c'_{122}$ | -1.5467 |
| $c'_{27}$ | -1.2401 | $c'_{59}$ | -1.1106 | $c'_{91}$ | -0.0201 | $c'_{123}$ | -0.3031 |
| $c'_{28}$ | 1.0527 | $c'_{60}$ | 0.6071 | $c'_{92}$ | -0.5860 | $c'_{124}$ | 0.9457 |
| $c'_{29}$ | 0.1199 | $c'_{61}$ | 0.7164 | $c'_{93}$ | -1.2284 | $c'_{125}$ | 1.9645 |
| $c'_{30}$ | 1.1496 | $c'_{62}$ | 0.8305 | $c'_{94}$ | -0.9215 | $c'_{126}$ | 1.4549 |
| $c'_{31}$ | -1.0544 | $c'_{63}$ | -1.2355 | $c'_{95}$ | 0.7941 | $c'_{127}$ | -1.2760 |
| $c'_{32}$ | 1.3176 | $c'_{64}$ | 1.1754 | $c'_{96}$ | -1.4128 | $c'_{128}$ | 2.2102 |

*FIG. 4b*

(UPDATED) PREAMBLE FOR FDMA

CROSS-REFERENCE TO RELATED APPLICATIONS

This application claims priority to U.S. Provisional Application No. 60/568,715 filed May 5, 2004, and entitled "New (Updated) Preamble for FDMA," by Anuj Batra et al, incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communications, and more particularly, but not by way of limitation, to a new preamble for frequency division multiple access communication.

BACKGROUND OF THE INVENTION

A network provides for communication among members of the network. Wireless networks allow connectionless communications. Wireless local area networks (WLANs) with ranges of about 100 meters or so have become increasingly popular. Wireless local area networks are generally tailored for use by computers and provide fairly sophisticated protocols to promote communications. Wireless personal area networks with ranges of about 10 meters are poised for growth, and increasing engineering development effort is committed to developing protocols supporting personal area networks.

With limited range, wireless personal area networks may have fewer members and require less power than wireless local area networks. The IEEE (Institute of Electrical and Electronics Engineers) is developing an IEEE 802.15.3a wireless personal area network standard directed to high data rate communications. The term piconet refers to a wireless personal area network having an ad hoc topology comprising communicating devices coordinated by a piconet coordinator (PNC). Piconets may form, reform, and abate spontaneously as various wireless devices enter and leave each other's proximity. Piconets may be characterized by their limited temporal and spatial extent. Physically adjacent wireless devices may group themselves into multiple piconets running simultaneously.

One proposal to the IEEE 802.15.3a task group is the multi-band orthogonal frequency division multiplex (MB-OFDM) proposal developed by the MBOA special interest group (SIG) that divides an approximately 7.5 GHz bandwidth from about 3.1 GHz to 10.6 GHz into fourteen approximately 528 MHz wide bands. These fourteen bands are organized into four band groups each having three 528 MHz bands and one band group of two 528 MHz bands. An example piconet may transmit a first MB-OFDM symbol in a first 312.5 nS duration time interval in a first frequency band of a band group, a second MB-OFDM symbol in a second 312.5 nS duration time interval in a second frequency band of the band group, and a third MB-OFDM symbol in a third 312.5 nS duration time interval in a third frequency band of the band group. Other piconets may also transmit concurrently using the same band group, discriminating themselves by using different time-frequency codes and a distinguishing preamble sequence. This method of piconets sharing a band group by transmitting on each of the three 528 MHz wide frequencies of the band group may be referred to as time frequency coding or time frequency interleaving (TFI). Alternately, piconets may transmit exclusively on one frequency band of the band group which may be referred to as fixed frequency interleaving (FFI). Piconets employing fixed frequency interleaving may distinguish themselves from other piconets employing time frequency interleaving by using a distinguishing preamble sequence. In practice four distinct preamble sequences may be allocated for time frequency interleaving identification purposes and one distinct preamble sequence has been allocated for fixed frequency interleaving. In different piconets different time-frequency codes may be used. In addition, different piconets may use different preamble sequences.

The structure of a message packet according to the Multi-band OFDM special interest group (SIG) physical layer specification comprises a preamble field, a header field, and a payload field. The preamble field may contain multiple instances of the distinct preamble sequence. The preamble field may be subdivided into a packet and frame detection sequence and a channel estimation sequence. The channel estimation sequence is a known sequence that may be used by a receiver to estimate the characteristics of the wireless communication channel to effectively compensate for adverse channel conditions. The preamble field, the header field, and the payload field may each be subdivided into a plurality of OFDM symbols.

SUMMARY OF THE INVENTION

According to one embodiment, a wireless device is provided that distinguishes between multiple piconets. The wireless device includes a preamble component and a correlator component. The preamble component provides a preamble for a wireless fixed frequency interleaving transmission, and the correlator component distinguishs a wireless transmission based on the preamble.

In another embodiment, a circuit is provided for a wireless receiver to despread a hierarchical sequence made by spreading an M-length sequence with an N-length sequence. The circuit includes a first and second despreaders. The first despreader is coupled to a signal input to despread a received signal. The signal is a fixed frequency interleaved transmission. The second despreader is coupled to an output of the first despreader. The second despreader despreads the output of the first despreader with a second sequence.

In still another embodiment, a method is provided for determining a K-length wireless message preamble. The method includes identifying K-length hierarchical sequences having about a zero mean. The method includes identifying K-length hierarchical sequences having first side lobes of an autocorrelation less than a first threshold. The method provides for calculating a cross-correlation for K-length hierarchical sequences with other time frequency interleaved preambles. The method further includes selecting a K-length hierarchical sequence having the autocorrelation greater than a second threshold, a cross-correlation with other time frequency interleaved preambles less than a third threshold, zero mean, and first side lobes of the autocorrelation less than the first threshold.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 3 illustrates a 128-length bi-phase valued hierarchical preamble sequence according to one embodiment.

FIG. 4b illustrates a 128-length spectrally flattened preamble sequence according to one embodiment.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Piconets may transmit exclusively on one frequency band of the band group, which may be referred to as fixed frequency interleaving (FFI). Fixed frequency interleaving may also be referred to as frequency division multiple access (FDMA). The use of fixed frequency interleaving may permit further reduction of the minimum allowable physical separation between separate piconets relative to the use of time frequency interleaving. Piconets employing fixed frequency interleaving may distinguish themselves from other piconets employing time frequency interleaving by using a distinguishing preamble sequence. In general, it may be preferable that the preamble for the fixed frequency interleaving have a zero average value, autocorrelate strongly to itself, have a weak first side lobe autocorrelation, and crosscorrelate weakly with the four predefined time frequency interleaving preambles. Additionally, power conservation advantages may be realized in a circuit implementation of a receiver if the fixed frequency interleaving preamble is a hierarchical sequence. For purposes of the present disclosure, a hierarchical sequence is defined to include a sequence of bi-phase values that may be formed by spreading a first sequence of bi-phase values with a second sequence of bi-phase values. This definition of hierarchical sequences also includes sequences of bi-phase values read from memory rather than constructing the sequence of bi-phase values using spreading.

Figure 1:
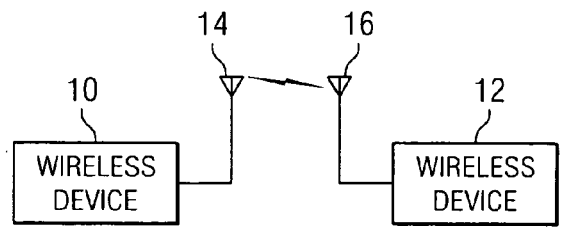
FIG. 1 is a diagram of two devices in wireless communication according to an embodiment.

Turning to FIG. 1, a block diagram of two wireless devices in wireless communication are depicted. A first wireless device 10 is in communication with a second wireless device 12. Both the first wireless device 10 and the second wireless device 12 contain receiver-transmitter assemblies used for transmitting and receiving messages. The first wireless device 10 has a first antenna 14 which it employs to transmit and receive messages. The second wireless device 12 has a second antenna 16 which it employs to transmit and receive messages. The first and second wireless devices 10, 12 are operable for communication using the new preamble according to various embodiments of the present disclosure.

Figure 2A:
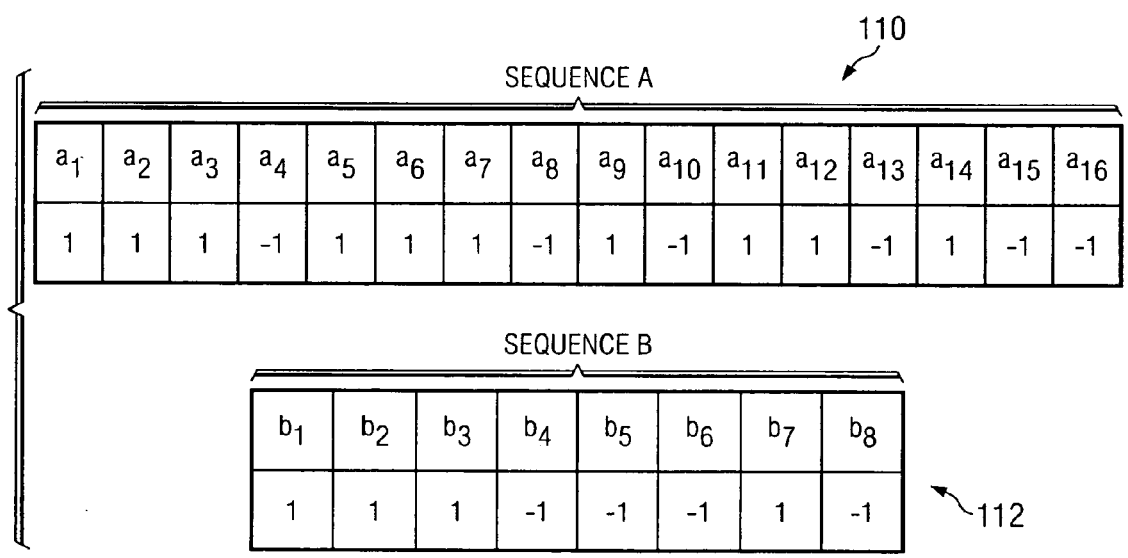
FIG. 2a illustrates a 16-length bi-phase valued sequence and a 8-length bi-phase valued sequence for generating a 128-length bi-phase valued hierarchical preamble sequence according to one embodiment of the present disclosure.

Turning to FIG. 2a, two numerical sequences are depicted. A sequence A 110 has length 16 and a sequence B 112 has length 8. Both the sequence A 110 and the sequence B 12 are bi-phase valued. As used herein the term bi-phase valued means that elements of the sequence may take on only one of two possible values and the values are symmetrically distributed about 0. For example, a bi-phase valued sequence may be composed of elements valued as 1 and −1. Alternatively, a bi-phase valued sequence may be composed of elements valued as 3 and −3. A bi-phase valued sequence may also be referred to as a symmetrical binary sequence, because only two values are valid for elements of the sequence. The sequence A is composed of sixteen ordered bi-phase values $a_1, a_2, \ldots a_{16}$. The sequence B is composed of eight ordered bi-phase values $b_1, b_2, \ldots b_8$. The sequence A 110 is reproduced in Table 1 and the sequence B 112 is reproduced in Table 2 for convenient reference below. The sequence A and the sequence B are preferred embodiments, but the present disclosure is not limited to these values and these sequences.

TABLE 1

| Sequence A. | | | | | | | | | | | | | | | |
|---|---|---|---|---|---|---|---|---|---|---|---|---|---|---|---|
| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
| 1 | 1 | 1 | −1 | 1 | 1 | 1 | −1 | 1 | −1 | 1 | 1 | −1 | 1 | −1 | −1 |

TABLE 2

Sequence B.

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1 |

Figure 2B:
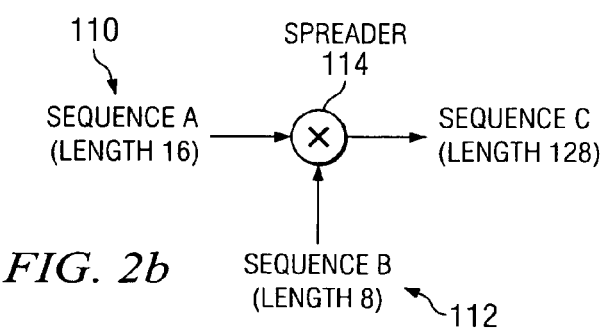
FIG. 2b illustrates a block diagram of one embodiment of a circuit for generating the 128-length bi-phase valued hierarchical preamble sequence based on the 16-length bi-phase valued sequence and the 8-length bi-phase valued sequence.

Turning to FIG. 2b, a diagram depicts a spreader component 114 mathematically spreading the sequence A 110 with the sequence B 112 to produce a preamble sequence C having length 128. Note that both the sequence A 110 and sequence B 112 may be proportionally scaled by multiplying through each of the elements of sequence A 110 and sequence B 112 by the same number.

Turning to FIG. 3, the preamble sequence is depicted. A preamble sequence C 120 has length 128. The preamble sequence C 120 is composed of 128 ordered bi-phase values $c_1, c_2, \ldots c_{128}$. The preamble sequence C 120 may be calculated as:

$$c_1 = a_1 b_1, c_2 = a_1 b_2, \ldots c_8 = a_1 b_8, c_9 = a_2 b_1, c_{10} = a_2 b_2, \ldots c_{16} = a_2 b_8, \ldots c_{121} = a_{16} b_1, c_{122} = a_{16} b_2, \ldots c_{128} = a_{16} b_8$$

The preamble sequence C 120 may be considered to be the matrix multiplication AB of a 16×1 matrix A (16 rows by 1 column) times a 1×8 matrix B (1 row by 8 columns). This matrix multiplication results in a 16 by 8 matrix. The 128 length sequence may be obtained by reading out the elements of the 16 by 8 matrix row-wise, one row at a time. The preamble sequence C 120 has the desired characteristics of a preamble for the fixed frequency interleaving. The preamble sequence C 120 may be scaled by a proportionality factor. For example, every element of the sequence C 120 may be multiplied by the same number to proportionally scale the preamble sequence. The preamble sequence C 120 has a zero average value. The preamble sequence C 120 autocorrelates strongly. The first side lobe of the autocorrelation of the preamble sequence C 120 is weak. The preamble sequence C 120 crosscorrelates weakly to each of the four time frequency interleaving preambles. Additionally, the preamble sequence C 120 is a hierarchical sequence, and a receiver may identify the preamble as a fixed frequency preamble with less complexity and hence less power consumption than would be the case if the preamble sequence C 120 were not a hierarchical sequence. The preamble sequence C 120 is reproduced in Table 3 below for convenient reference. The sequence C 120 and proportionally scaled versions of the sequence C 120 are a preferred embodiment, but the present disclosure is not limited to these values and this sequence.

TABLE 3

Sequence C.

| Sequence Element | Value |
|---|---|
| $C_1$ | 1 |
| $C_2$ | 1 |
| $C_3$ | 1 |
| $C_4$ | −1 |
| $C_5$ | −1 |
| $C_6$ | −1 |
| $C_7$ | 1 |
| $C_8$ | −1 |
| $C_9$ | 1 |
| $C_{10}$ | 1 |
| $C_{11}$ | 1 |

TABLE 3-continued

Sequence C.

| Sequence Element | Value |
|---|---|
| $C_{12}$ | −1 |
| $C_{13}$ | −1 |
| $C_{14}$ | −1 |
| $C_{15}$ | 1 |
| $C_{16}$ | −1 |
| $C_{17}$ | 1 |
| $C_{18}$ | 1 |
| $C_{19}$ | 1 |
| $C_{20}$ | −1 |
| $C_{21}$ | −1 |
| $C_{22}$ | −1 |
| $C_{23}$ | 1 |
| $C_{24}$ | −1 |
| $C_{25}$ | −1 |
| $C_{26}$ | −1 |
| $C_{27}$ | −1 |
| $C_{28}$ | 1 |
| $C_{29}$ | 1 |
| $C_{30}$ | 1 |
| $C_{31}$ | −1 |
| $C_{32}$ | 1 |
| $C_{33}$ | 1 |
| $C_{34}$ | 1 |
| $C_{35}$ | 1 |
| $C_{36}$ | −1 |
| $C_{37}$ | −1 |
| $C_{38}$ | −1 |
| $C_{39}$ | 1 |
| $C_{40}$ | −1 |
| $C_{41}$ | 1 |
| $C_{42}$ | 1 |
| $C_{43}$ | 1 |
| $C_{44}$ | −1 |
| $C_{45}$ | −1 |
| $C_{46}$ | −1 |
| $C_{47}$ | 1 |
| $C_{48}$ | −1 |
| $C_{49}$ | 1 |
| $C_{50}$ | 1 |
| $C_{51}$ | 1 |
| $C_{52}$ | −1 |
| $C_{53}$ | −1 |
| $C_{54}$ | −1 |
| $C_{55}$ | 1 |
| $C_{56}$ | −1 |
| $C_{57}$ | −1 |
| $C_{58}$ | −1 |
| $C_{59}$ | −1 |
| $C_{60}$ | 1 |
| $C_{61}$ | 1 |
| $C_{62}$ | 1 |
| $C_{63}$ | −1 |
| $C_{64}$ | 1 |
| $C_{65}$ | 1 |
| $C_{66}$ | 1 |
| $C_{67}$ | 1 |
| $C_{68}$ | −1 |
| $C_{69}$ | −1 |
| $C_{70}$ | −1 |
| $C_{71}$ | 1 |
| $C_{72}$ | −1 |
| $C_{73}$ | −1 |
| $C_{74}$ | −1 |
| $C_{75}$ | −1 |
| $C_{76}$ | 1 |
| $C_{77}$ | 1 |
| $C_{78}$ | 1 |
| $C_{79}$ | −1 |
| $C_{80}$ | 1 |
| $C_{81}$ | 1 |
| $C_{82}$ | 1 |
| $C_{83}$ | 1 |
| $C_{84}$ | −1 |
| $C_{85}$ | −1 |
| $C_{86}$ | −1 |

TABLE 3-continued

Sequence C.

| Sequence Element | Value |
| --- | --- |
| $C_{87}$ | 1 |
| $C_{88}$ | −1 |
| $C_{89}$ | 1 |
| $C_{90}$ | 1 |
| $C_{91}$ | 1 |
| $C_{92}$ | −1 |
| $C_{93}$ | −1 |
| $C_{94}$ | −1 |
| $C_{95}$ | 1 |
| $C_{96}$ | −1 |
| $C_{97}$ | −1 |
| $C_{98}$ | −1 |
| $C_{99}$ | −1 |
| $C_{100}$ | 1 |
| $C_{101}$ | 1 |
| $C_{102}$ | 1 |
| $C_{103}$ | −1 |
| $C_{104}$ | 1 |
| $C_{105}$ | 1 |
| $C_{106}$ | 1 |
| $C_{107}$ | 1 |
| $C_{108}$ | −1 |
| $C_{109}$ | −1 |
| $C_{110}$ | −1 |
| $C_{111}$ | 1 |
| $C_{112}$ | −1 |
| $C_{113}$ | −1 |
| $C_{114}$ | −1 |
| $C_{115}$ | −1 |
| $C_{116}$ | 1 |
| $C_{117}$ | 1 |
| $C_{118}$ | 1 |
| $C_{119}$ | −1 |
| $C_{120}$ | 1 |
| $C_{121}$ | −1 |
| $C_{122}$ | −1 |
| $C_{123}$ | −1 |
| $C_{124}$ | 1 |
| $C_{125}$ | 1 |
| $C_{126}$ | 1 |
| $C_{127}$ | −1 |
| $C_{128}$ | 1 |

When transmitting the preamble sequence C 120, the power spectrum density on the band may be less than the maximum allowable. It is preferred to transmit at maximum power, as this may improve the signal to noise ratio (SNR) experienced by the receiver and hence improve reception of the preamble at the receiver. By transforming the preamble sequence C 120 into the frequency domain, modifying the amplitude function of the preamble sequence C 120 in the frequency domain to achieve maximum power spectrum density, and transforming the modified sequence back to the time domain, a spectrally flattened preamble sequence may be defined.

Figure 4A:
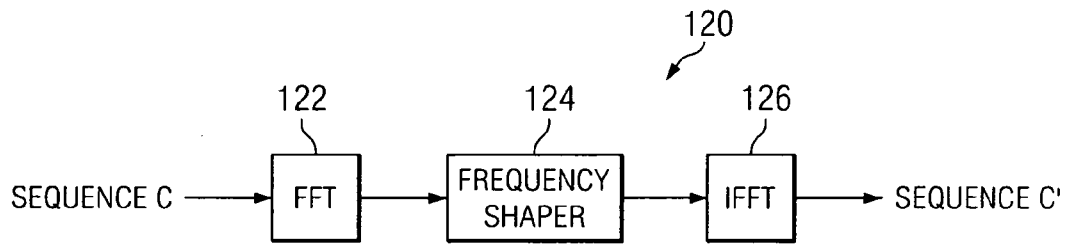
FIG. 4a is a block diagram of a portion of a transmitter for adjusting the spectral characteristics of the 128-length bi-phase valued hierarchical preamble sequence according to one embodiment.

Turning to FIG. 4a, a portion of a transmitter circuit 120 for adjusting the spectral characteristics of the preamble sequence C 120 is depicted. The preamble sequence C 120 may be passed through a fast Fourier transformer component 122 to produce a frequency domain representation, spectrally reshaping the frequency domain representation in a frequency shaper component 124, and passing the reshaped frequency domain representation through an inverse fast Fourier transformer component 126 to produce a time domain spectrally adjusted preamble sequence C'. The shaping of the amplitude function of the preamble sequence C 120 in the frequency domain, which may be termed adjusting the spectral characteristics of the sequence, does not alter the phase function of the preamble sequence C 120 in the frequency domain. The preamble sequence C 120 may also be modified in a similar manner to provide other arbitrary shapes to provide some desired frequency characteristic. For example, notches may be introduced in the frequency spectrum to protect services. A transmitter device may adjust the spectral characteristics of the preamble in response to changing wireless communication channel conditions. This may be termed adjusting spectral characteristics on the fly. Note that the notch location or locations may be changed over time.

Turning to FIG. 4b, the spectrally flattened preamble sequence is depicted. A spectrally flattened preamble sequence C' 130 has length 128 and is composed of the ordered sequence of values $c'_1, c'_2, \ldots c'_{128}$. The spectrally flattened preamble sequence C' 130 is reproduced in Table 4 below for convenient reference. The sequence C' and proportionally scaled versions of the sequence C' are a preferred embodiment, but the present disclosure is not limited to these values and this sequence.

TABLE 4

Spectrally Flattened Preamble Sequence C'.

| Sequence Element | Value |
| --- | --- |
| $C'_1$ | 0.9574 |
| $C'_2$ | 0.5270 |
| $C'_3$ | 1.5929 |
| $C'_4$ | −0.2500 |
| $C'_5$ | −0.2536 |
| $C'_6$ | −0.3023 |
| $C'_7$ | 1.2907 |
| $C'_8$ | −0.4258 |
| $C'_9$ | 1.0012 |
| $C'_{10}$ | 1.7704 |
| $C'_{11}$ | 0.8593 |
| $C'_{12}$ | −0.3719 |
| $C'_{13}$ | −1.3465 |
| $C'_{14}$ | −0.7419 |
| $C'_{15}$ | 1.5350 |
| $C'_{16}$ | −1.2180 |
| $C'_{17}$ | 0.6955 |
| $C'_{18}$ | 1.7204 |
| $C'_{19}$ | 0.1643 |
| $C'_{20}$ | −0.3347 |
| $C'_{21}$ | −1.7244 |
| $C'_{22}$ | −0.7447 |
| $C'_{23}$ | 1.1141 |
| $C'_{24}$ | −1.3541 |
| $C'_{25}$ | −0.7293 |
| $C'_{26}$ | 0.2682 |
| $C'_{27}$ | −1.2401 |
| $C'_{28}$ | 1.0527 |
| $C'_{29}$ | 0.1199 |
| $C'_{30}$ | 1.1496 |
| $C'_{31}$ | −1.0544 |
| $C'_{32}$ | 1.3176 |
| $C'_{33}$ | 0.8400 |
| $C'_{34}$ | 1.3980 |
| $C'_{35}$ | 1.1147 |
| $C'_{36}$ | −0.4732 |
| $C'_{37}$ | −1.7178 |
| $C'_{38}$ | −0.8477 |
| $C'_{39}$ | 1.5083 |
| $C'_{40}$ | −1.4364 |
| $C'_{41}$ | 0.3853 |
| $C'_{42}$ | 1.5673 |
| $C'_{43}$ | 0.0295 |
| $C'_{44}$ | −0.4204 |
| $C'_{45}$ | −1.4856 |
| $C'_{46}$ | −0.8404 |
| $C'_{47}$ | 1..0111 |
| $C'_{48}$ | −1.4269 |
| $C'_{49}$ | 0.3033 |
| $C'_{50}$ | 0.7757 |
| $C'_{51}$ | −0.1370 |

TABLE 4-continued

Spectrally Flattened Preamble Sequence C'.

| Sequence Element | Value |
|---|---|
| $C'_{52}$ | −0.5250 |
| $C'_{53}$ | −1.1589 |
| $C'_{54}$ | −0.8324 |
| $C'_{55}$ | 0.6336 |
| $C'_{56}$ | −1.2698 |
| $C'_{57}$ | −0.7853 |
| $C'_{58}$ | −0.7031 |
| $C'_{59}$ | −1.1106 |
| $C'_{60}$ | 0.6071 |
| $C'_{61}$ | 0.7164 |
| $C'_{62}$ | 0.8305 |
| $C'_{63}$ | −1.2355 |
| $C'_{64}$ | 1.1754 |
| $C'_{65}$ | 0.5859 |
| $C'_{66}$ | 0.3053 |
| $C'_{67}$ | 0.2408 |
| $C'_{68}$ | −0.6744 |
| $C'_{69}$ | −0.2361 |
| $C'_{70}$ | −0.8133 |
| $C'_{71}$ | 0.9201 |
| $C'_{72}$ | −1.0841 |
| $C'_{73}$ | −0.8036 |
| $C'_{74}$ | −0.3105 |
| $C'_{75}$ | −1.0514 |
| $C'_{76}$ | 0.7644 |
| $C'_{77}$ | 0.7301 |
| $C'_{78}$ | 0.9788 |
| $C'_{79}$ | −1.1305 |
| $C'_{80}$ | 1.3257 |
| $C'_{81}$ | 0.7801 |
| $C'_{82}$ | 0.7867 |
| $C'_{83}$ | 1.0996 |
| $C'_{84}$ | −0.5623 |
| $C'_{85}$ | −1.2227 |
| $C'_{86}$ | −0.8223 |
| $C'_{87}$ | 1.2074 |
| $C'_{88}$ | −1.2338 |
| $C'_{89}$ | 0.2957 |
| $C'_{90}$ | 1.0999 |
| $C'_{91}$ | −0.0201 |
| $C'_{92}$ | −0.5194 |
| $C'_{93}$ | −1.2284 |
| $C'_{94}$ | −0.9215 |
| $C'_{95}$ | 0.7941 |
| $C'_{96}$ | −1.4128 |
| $C'_{97}$ | −0.8528 |
| $C'_{98}$ | −0.6973 |
| $C'_{99}$ | −1.2477 |
| $C'_{100}$ | 0.6246 |
| $C'_{101}$ | 0.7687 |
| $C'_{102}$ | 0.7966 |
| $C'_{103}$ | −1.2809 |
| $C'_{104}$ | 1.1023 |
| $C'_{105}$ | 0.4250 |
| $C'_{106}$ | −0.1614 |
| $C'_{107}$ | 0.7547 |
| $C'_{108}$ | −0.6696 |
| $C'_{109}$ | −0.3920 |
| $C'_{110}$ | −0.7589 |
| $C'_{111}$ | 0.6701 |
| $C'_{112}$ | −0.9381 |
| $C'_{113}$ | −0.7483 |
| $C'_{114}$ | −0.9659 |
| $C'_{115}$ | −0.9192 |
| $C'_{116}$ | 0.3925 |
| $C'_{117}$ | 1.2864 |
| $C'_{118}$ | 0.6784 |
| $C'_{119}$ | −1.0909 |
| $C'_{120}$ | 1.1140 |
| $C'_{121}$ | −0.6134 |
| $C'_{122}$ | −1.5467 |
| $C'_{123}$ | −0.3031 |
| $C'_{124}$ | 0.9457 |
| $C'_{125}$ | 1.9645 |
| $C'_{126}$ | 1.4549 |

TABLE 4-continued

Spectrally Flattened Preamble Sequence C'.

| Sequence Element | Value |
|---|---|
| $C'_{127}$ | −1.2760 |
| $C'_{128}$ | 2.2102 |

The spectrally flattened preamble sequence C' 130 defined above may be stored in memory and read back from memory when transmitting, or the spectrally flattened sequence C' 130 may be calculated at transmission time.

Figure 5A:
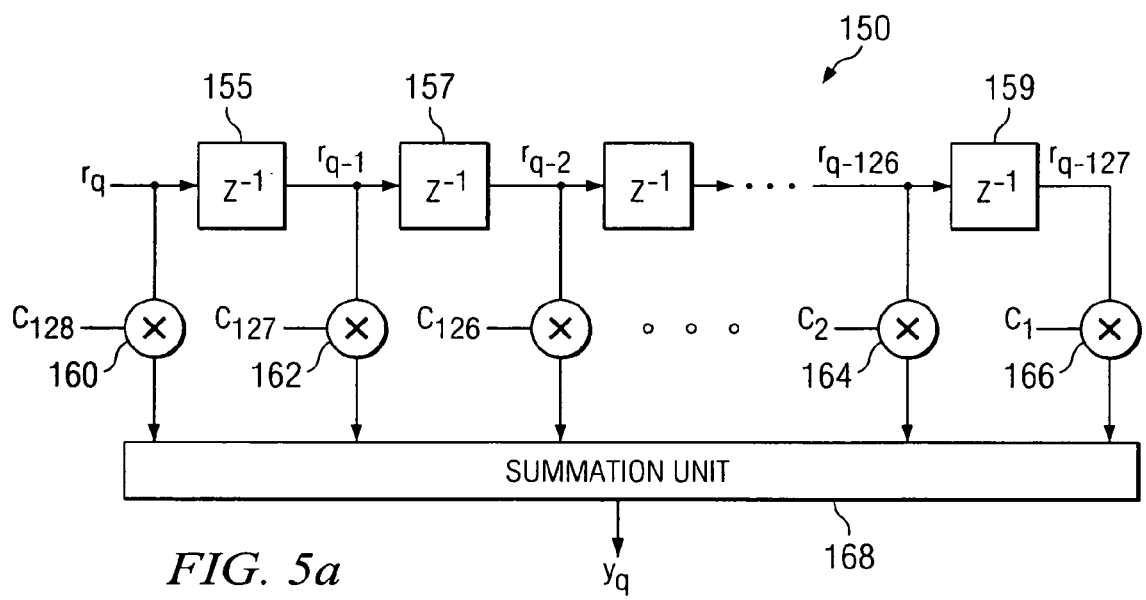
FIG. 5a is a block diagram of a one-step 128-length despreader according to one embodiment of the present disclosure.

Turning now to FIG. 5a, a block diagram is provided that illustrates a despreader 150 for use in extracting a spreading sequence from a received signal. The despreader 150 may also be used to detect a particular preamble sequence within a sequence of received samples. The samples may be generated by periodically sampling and digitizing a received signal, for example a radio transmission in a piconet. The despreader 150 performs the despreading with the entire spreading sequence at one time, for example, the despreader 150 would despread received data that was originally spread with a spreading sequence of length 128 with the 128-length sequence. The spreading sequence is the fixed frequency interleaved preamble. As displayed in FIG. 5a, the despreader 150 can be implemented as a tapped delay line. Tapped delay lines are considered to be well understood by those of ordinary skill in the art and for this reason will not be discussed in detail herein.

According to the preferred embodiment, the despreader 150 may be described where $r_q$ denotes the q-th symbol of the received signal, $y_q$ denotes the q-th symbol of the despread data, and $c_j$ denotes the j-th value of the fixed frequency interleaving preamble. $c_j$ may also be referred to as the j-th coefficient of the spreading sequence. The received signal may be provided to a linear array of delay elements, for example, delay element 155 and 157. Note that the linear array of delay elements may be referred to as a tapped delay line. The delay elements may have a unity delay. Therefore, if $r_q$ is the input to the delay element 155, then $r_{q-1}$ is the output of the delay element 155 while $r_{q-2}$ is the output of the delay element 157. If the spreading sequence is of length k, then there are k−1 delay elements in the tapped delay line. In addition to having an output coupled to the following delay element, the output of each delay element may also be coupled to a multiplier. For example, delay element 155 may have its output coupled to delay element 157 as well as multiplier 162. Note that an additional multiplier, multiplier 160, may have as its input the received signal $r_k$.

Each multiplier has as a second input a coefficient of the spreading sequence, with a multiplier coupled to a first delay element in the tapped delay line having the last coefficient of the spreading sequence ($C_k$). The second input to each of the subsequent multipliers are the remaining coefficients of the spreading sequence. For example, with the 128-length spreading sequence, then the second input to the multiplier 160 would be $c_{128}$ and for multiplier 162, it would be $c_{127}$. Output from each of the multipliers can then be provided to a summation unit 168 that can combine the outputs together to produce the despread data.

Figure 5B:
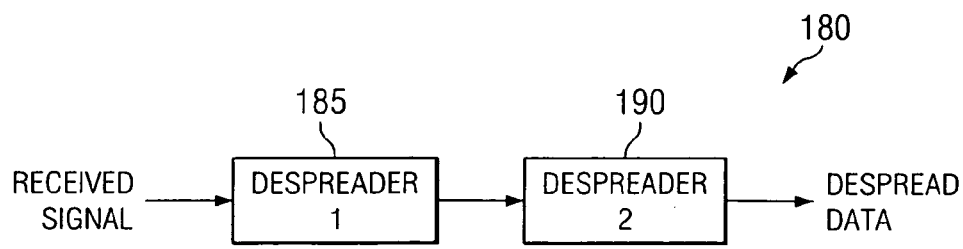
FIG. 5b is a block diagram of a two stage despreader according to another embodiment.

FIG. 5b illustrates a high-level view of a two-stage despreader 180 for use in detecting a hierarchical spreading sequence in the received signal, according to a preferred embodiment of the present invention. The two-stage despreader 180 may also be used to detect a sequence in a preamble. When a hierarchical sequence is used as a spreading sequence, the despreading of the received signal may also be performed using a despreader similar to the despreader 150 (FIG. 5a) wherein the despreading is performed in a single step with the full spreading sequence. However, as discussed above, the single step despreading may lead to a complex despreader that may consume a large amount of power. Therefore, when a hierarchical spreading sequence is used, the despreading can occur as a two-step operation. The resulting despreader may use fewer logic gates and therefore use less power.

The received signal may first be provided to a first despreader 185, which can perform a despreading operation with a second sequence, wherein the hierarchical spreading sequence may be the result of the first sequence being spread with a second sequence. Note that if the first sequence is of length M and the second sequence is of length N, then the hierarchical spreading sequence is of length M*N. After being despread with the second sequence in the first despreader 185, the output of the first despreader 185 may then be provided to a second despreader 190, which can perform a despreading on the output of the first despreader 185 with the first sequence. Note that the second despreader 190 should despread every N-th output of the first despreader.

According to a preferred embodiment of the present invention, the order of the despreading can be independent of the order of the spreading. If the first despreader 185 were to despread the received signal with the first sequence (the M-length sequence), then the first despreader 185 should despread every N-th received sample. The output of the first despreader 185 may then be provided to the second despreader 190, which can despread every output of the first despreader 185 with the second sequence (the N-length sequence).

Figure 5C:
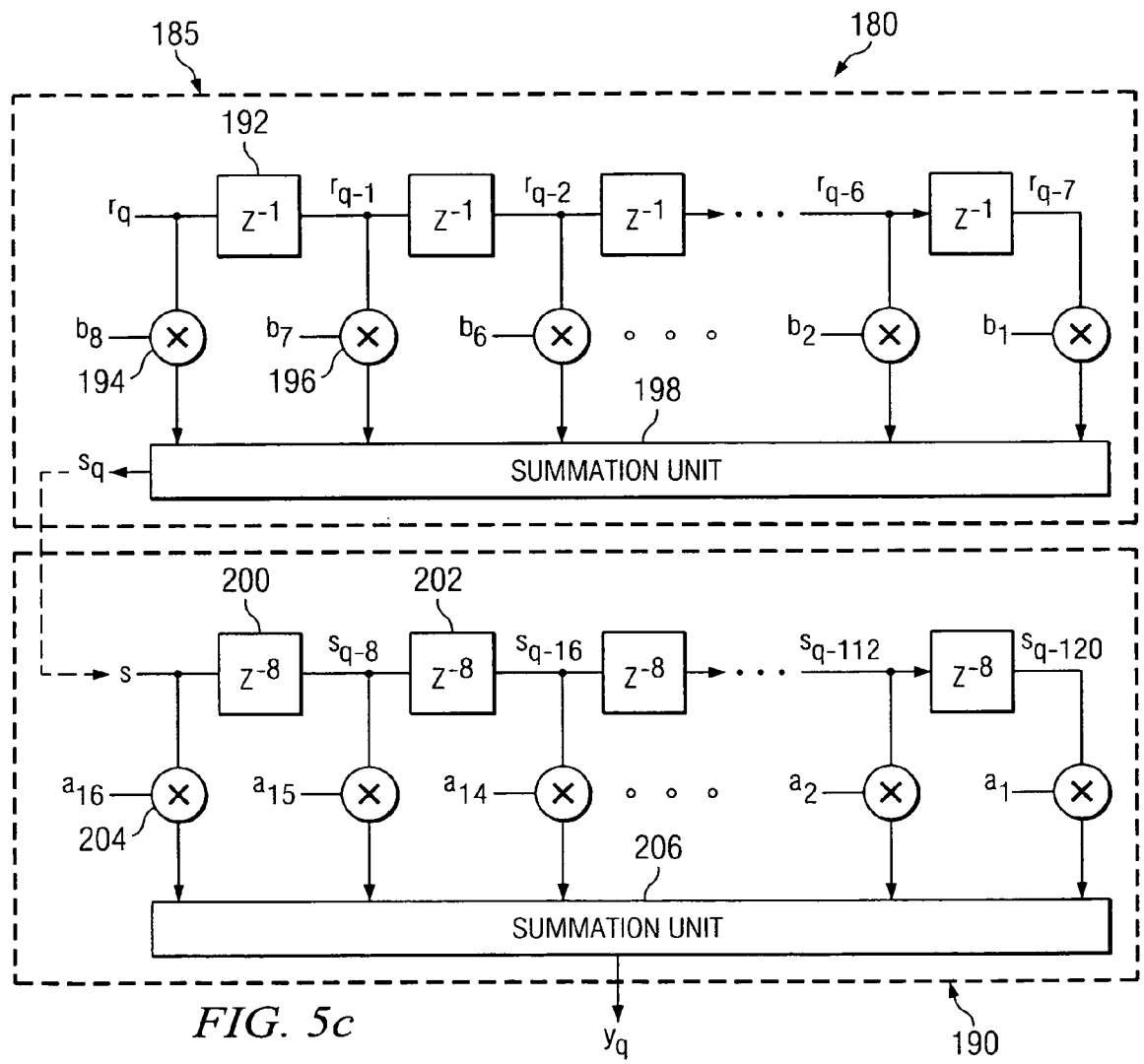
FIG. 5c is a block diagram of a two stage despreader, having a first stage using an 8-length despreader and a second stage using a 16-length despreader, according to another embodiment of the present disclosure.

FIG. 5c illustrates a detailed view of the two-stage despreader 180 for use in removing a hierarchical spreading sequence from a received signal, according to a preferred embodiment of the present invention. As shown in FIG. 5c, the first despreader 185 will despread with the N-length spreading sequence and the second despreader 190 will despread with the M-length spreading sequence.

The design of the first and the second despreaders 185 and 190 uses the tapped delay line structure of the despreader 150 (FIG. 5a), with differences mainly in the coefficients, the value of the delay elements, and the input signals. Since the first despreader 185 despreads the received signal with the N-length spreading sequence, the received signal, $r_q$, can be the input to the first despreader 185 at the tapped delay line. As in the despreader 150, the number of delay elements should be one less than the length of the spreading sequence (N). According to a preferred embodiment of the present invention, each of the delay elements (for example, delay element 192) may have a unity delay. Coupled to each of the delay elements is a multiplier that can be used to multiply the output of the delay element with a coefficient of the spreading sequence, with an additional multiplier being coupled to the received signal, $r_q$. For example, a multiplier 194 multiplies the received signal, $r_q$, with an eighth coefficient of the N-length spreading sequence, while a multiplier 196 multiplies the output of delay element 192 with a seventh coefficient of the N-length spreading sequence. A summation unit 198 combines the outputs of the multipliers to form an intermediate signal, $s_q$.

The second despreader 190, which despreads every N-th output produced by the first despreader 185, has a design that differs slightly from the design of the first despreader 185. The second despreader 190 also makes use of a tapped delay line, but rather than the delay elements having unity delay, the delay elements (such as delay elements 200 and 202) have delays that can be equal to the length of the spreading sequence used in the first despreader 185, which in this discussion, is N=8. The number of delay elements in the tapped delay line is one less than the length of the spreading sequence (M) while the number of multipliers (such as multiplier 204) is equal to the length of the spreading sequence (M). As in the first despreader 185, the multipliers multiply the outputs of the delay elements with the coefficients of the spreading sequence. For example, the multiplier 204 multiplies the intermediate signal, $s_q$, with a sixteenth coefficient of the spreading sequence. A summation unit 206 combines the outputs of the multipliers to produce the despread data, $y_q$.

Figure 5D:
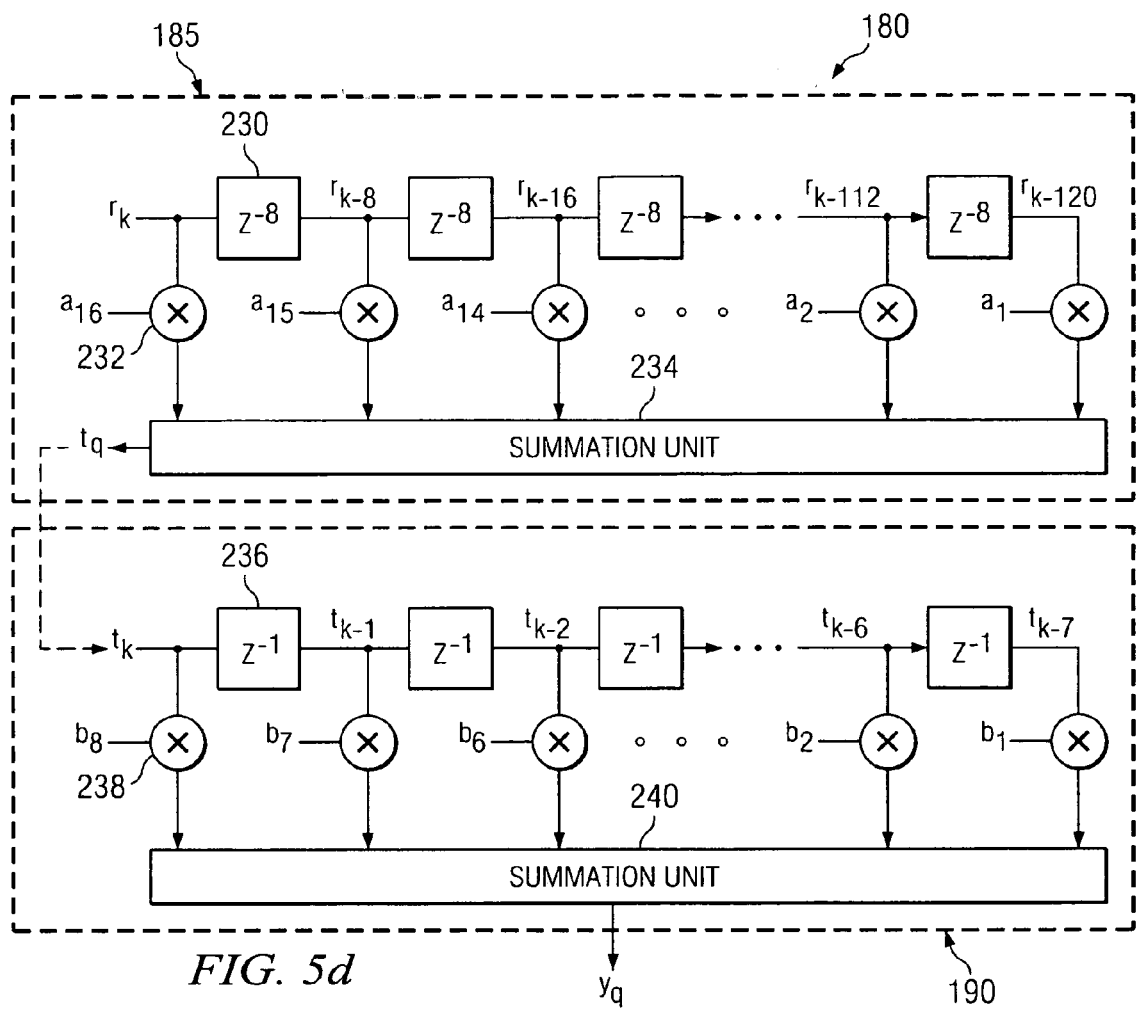
FIG. 5d is a block diagram of another embodiment of a two stage despreader, having a first stage using a 16-length despreader and a second stage using an 8-length despreader.

FIG. 5d illustrates a detailed view of another embodiment of the two-stage despreader 180 for use in extracting a hierarchical spreading sequence from a received signal, according to a preferred embodiment of the present invention. As shown in FIG. 5d, the first despreader 185 will despread with the M-length spreading sequence and the second despreader 190 will despread with the N-length spreading sequence.

Since the received signal may have been originally an M-length sequence that was spread with an N-length sequence, the first despreader 185 may be configured to despread every N-th received sample. This may be accomplished by using a tapped delay line with delay elements, such as delay element 230, having a delay equal to N=8. Multipliers, such as multiplier 232 can multiply the outputs of the delay elements (or in the case of the multiplier 232, the received signal) with coefficients of the M-length spreading sequence. A summation unit 234 can combine the outputs of the multipliers to produce an intermediate value, $t_q$.

The second despreader 190 may have a more conventional design, wherein its tapped delay line may have delay elements, such as delay element 236, with unity delay. Again, multipliers, such as multiplier 238 can multiply the outputs of the delay elements (or in the case of the multiplier 238, the intermediate signal) with the coefficients of the N-length spreading sequence. A summation unit 240 can combine the outputs of the multipliers to produce the despread data, $y_k$.

Figure 6:
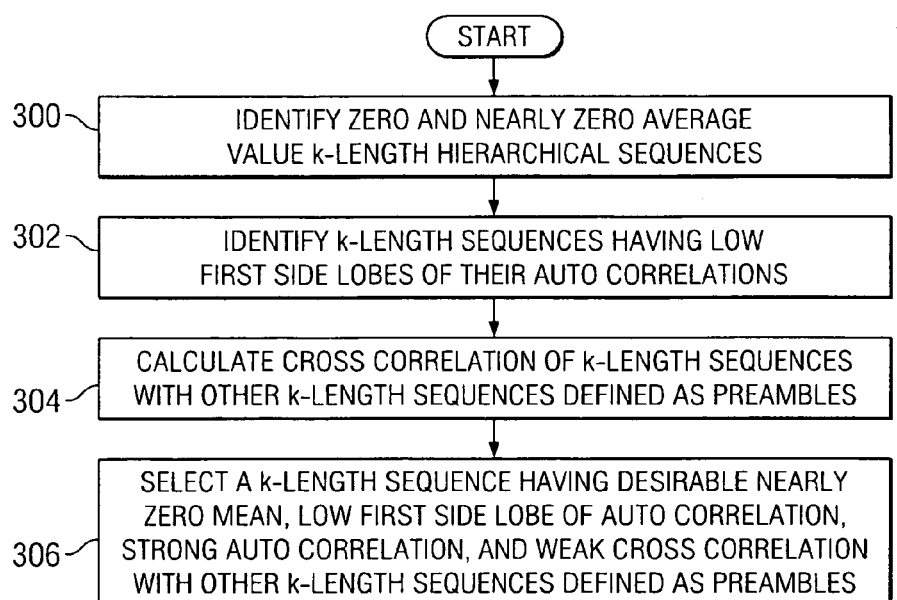
FIG. 6 depicts a method for selecting a fixed frequency interleaving hierarchical preamble according to an embodiment of the present disclosure.

Turning to FIG. 6, a method of selecting a fixed frequency interleaving K-length preamble is depicted. Note that for the purpose of selecting a fixed frequency interleaving K-length preamble that one need only analyze the K-length sequences composed of 1 and −1. The result obtained from this analysis will apply equally to the K-length sequences composed of other bi-phase value pairs, for example 2 and −2, 3 and −3, and so forth. In block 300, all K-length hierarchical sequences of bi-phase values are analyzed to determine the average value of each K-length hierarchical sequence of bi-phase values. Those K-length sequences of bi-phase values which have an about zero average are identified. While a zero average value is preferred, in an embodiment K-length sequences having nearly zero average value also may be identified. A zero or nearly zero average value of the hierarchical sequence has desirable transmission characteristics as known to one of ordinary skill in the art.

The method proceeds to block 302 where the autocorrelations of all K-length hierarchical sequences of bi-phase values are calculated. The K-length sequences that have first side lobes of their autocorrelation that are less than a first threshold are identified. In an exemplary case, the first threshold may be −4 dB and preferably −13 dB. A weak first side lobe of the autocorrelation promotes synchronization of the receiver, as is readily appreciated by one of ordinary skill in the art. In some embodiments the activity of block 302 may precede the activity of block 300.

The method proceeds to block 304 where the cross-correlations of all K-length hierarchical sequences of bi-phase values with each of the other K-length bi-phase sequences predefined as preambles for time frequency interleaving piconets are calculated.

The method proceeds to block 306 where one of the K-length hierarchical sequences is selected. The selection is made from the K-length hierarchical sequences that were both identified in block 300 as having zero mean or nearly zero mean and identified in block 302 as having autocorrelations having weak first side lobes, less than the first threshold. From this selection of K-length hierarchical sequence, a K-length hierarchical sequence is selected that has an autocorrelation greater than a second threshold and a cross correlation less than a third threshold. In an exemplary case, the second threshold may be −2 dB and preferably −1 dB, and the third threshold may be −4 dB and preferably −7 dB. This method may identify many K-length hierarchical sequences. One skilled in the art will readily appreciate and understand how to revise the thresholds to increase or decrease, as desirable, the number of K-length hierarchical sequences identified by this method.

While any of these K-length hierarchical sequences may be operable for promoting reliable and robust communications, one skilled in the art will readily appreciate that further constraining the acceptable autocorrelation first side lobe, the autocorrelation, the mean value, and the crosscorrelation values described above will lead to reducing the pool of K-length hierarchical sequences to a very small number from which to select the K-length hierarchical sequence to use as a preamble. It is readily appreciated by one of ordinary skill in the art that a preamble which has a weak crosscorrelation with other preambles and a strong autocorrelation with itself is more readily distinguished from those other preambles. Similarly, one of ordinary skill in the art readily appreciates that a weak first side lobe of the autocorrelation of the preamble, in combination with a strong autocorrelation of the preamble, promotes synchronization of the received message packet in the receiver. In the preferred embodiment, the value of K is 128.

The spreader component 114, the single stage despreader 150, and the two stage despreader 180 described above are functional blocks that may be implemented as software which is executed on a general purpose central processing unit. Alternatively, the spreader component 114, the single stage despreader 150, and the two stage despreader 180 may be realized in integrated circuits, for example application specific integrated circuits (ASICs), field programmable gate arrays (FPGAs), complex programmable logic devices (CPLDs), portions of digital signal processors, portions of microprocessors, portions of microcontrollers, or other special purpose circuit realizations known to those skilled in the art. The spreader component 114, the single stage despreader 150, and the two stage despreader 180 may be combined with one or more of the other components as a "system on a chip" including the antennas 14, 16 and other typical components of a communication transmitter/receiver.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A circuit for a wireless receiver for use in a multi-band orthogonal frequency division multiplex (MB-OFDM) communication system to despread a hierarchical sequence made by spreading an M-length sequence with an N-length sequence, the circuit comprising:

a first despreader coupled to a signal input, the first despreader to despread a received signal include a fixed frequency interleaved transmissions with a first sequence, wherein the signal is multi-band orthogonal frequency division modulation transmission including a preamble that makes use of the heirarchical sequence; and a second despreader coupled to an output of the first despreader, the second despreader to despread the output of the first despreader with a second sequence, wherein one of the first or second despreader has N multipliers and N-1 delay elements and the other of the first or second despreader has M multipliers and M-1 delay elements.

2. circuit of claim 1, wherein the first and second despreader comprises:

a serially coupled chain of the delay elements, a first delay element is coupled to an input;

a first of the N or M multipliers having a first input coupled to the input and the remaining of the N or M multipliers having the first input coupled to an output of one delay element and each multiplier having a second input coupled to a coefficient of the first sequence; and a summation unit coupled to outputs of each multiplier, the summation unit to combine the outputs of each multiplier to produce a value, wherein the first sequence is the N-length sequence and the second sequence is the M-length sequence, and wherein the first despreader has the N-1 delay elements and N multipliers and the second despreader has the M-1 delay elements and M multipliers.

3. The circuit of claim 2, wherein N is equal to 8 and the N-length sequence of bi-phase values is proportional to:

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1 | and M is equal to 16 and the M-length sequence of bi-phase values is proportional to:

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | −1 | 1 | 1 | 1 | −1 | 1 | −1 | 1 | 1 | −1 | 1 | −1 | −1. |

4. The circuit of claim 1, wherein the first and second despreader further includes:
  a serially coupled chain of delay elements, a first delay element is coupled to an input;
  a plurality of multipliers, wherein a first multiplier has a first input coupled to the input and the remaining multipliers have the first input coupled to an output of one delay element and each multiplier has a second input coupled to a coefficient of the first sequence; and
  a summation unit coupled to outputs of each multiplier, the summation unit to combine the outputs of each multiplier to produce a value, wherein the first sequence is the M-length sequence and the second sequence is the N-length sequence, and wherein the first despreader has M-1 delay elements and M multipliers and the second despreader has N-1 delay elements and N multipliers.

5. The circuit of claim 4, wherein N is equal to 16 and the N-length sequence of bi-phase values is proportional to:

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | −1 | 1 | 1 | 1 | −1 | 1 | −1 | 1 | 1 | −1 | 1 | −1 | −1 | and M is equal to 8 and the M-length sequence of bi-phase values is proportional to:

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1. |

6. The circuit of claim 1, wherein the fixed frequency interleaved transmission is in a piconet.

7. The circuit of claim 1, wherein the delay elements of one of the first or second despreader has a unit delay and the delay elements of the other of the first or second despreader has a delay equal to the number of multipliers of the one of the first or second despreader.

8. A wireless device that distinguishes between multiple piconets, the wireless device comprising:
  a preamble component operable to provide a preamble for a wireless orthogonal frequency division modulation transmission; and
  a correlator component operable to distinguish a wireless transmission based on the preamble,
    wherein the preamble component reads the preamble out of a memory area, the preamble further defined as proportional to the following ordered sequence of 128 bi-phase values:

| Sequence Element | Value |
|---|---|
| $C_1$ | 1 |
| $C_2$ | 1 |
| $C_3$ | 1 |
| $C_4$ | −1 |
| $C_5$ | −1 |
| $C_6$ | −1 |
| $C_7$ | 1 |
| $C_8$ | −1 |
| $C_9$ | 1 |
| $C_{10}$ | 1 |
| $C_{11}$ | 1 |
| $C_{12}$ | −1 |
| $C_{13}$ | −1 |
| $C_{14}$ | −1 |
| $C_{15}$ | 1 |
| $C_{16}$ | −1 |
| $C_{17}$ | 1 |

-continued

| Sequence Element | Value |
|---|---|
| $C_{18}$ | 1 |
| $C_{19}$ | 1 |
| $C_{20}$ | −1 |
| $C_{21}$ | −1 |
| $C_{22}$ | −1 |
| $C_{23}$ | 1 |
| $C_{24}$ | −1 |
| $C_{25}$ | −1 |
| $C_{26}$ | −1 |
| $C_{27}$ | −1 |
| $C_{28}$ | 1 |
| $C_{29}$ | 1 |
| $C_{30}$ | 1 |
| $C_{31}$ | −1 |
| $C_{32}$ | 1 |
| $C_{33}$ | 1 |
| $C_{34}$ | 1 |
| $C_{35}$ | 1 |
| $C_{36}$ | −1 |
| $C_{37}$ | −1 |
| $C_{38}$ | −1 |
| $C_{39}$ | 1 |
| $C_{40}$ | −1 |
| $C_{41}$ | 1 |
| $C_{42}$ | 1 |
| $C_{43}$ | 1 |
| $C_{44}$ | −1 |
| $C_{45}$ | −1 |
| $C_{46}$ | −1 |
| $C_{47}$ | 1 |
| $C_{48}$ | −1 |
| $C_{49}$ | 1 |
| $C_{50}$ | 1 |

-continued

| Sequence Element | Value |
| --- | --- |
| $C_{51}$ | 1 |
| $C_{52}$ | -1 |
| $C_{53}$ | -1 |
| $C_{54}$ | -1 |
| $C_{55}$ | 1 |
| $C_{56}$ | -1 |
| $C_{57}$ | -1 |
| $C_{58}$ | -1 |
| $C_{59}$ | -1 |
| $C_{60}$ | 1 |
| $C_{61}$ | 1 |
| $C_{62}$ | 1 |
| $C_{63}$ | -1 |
| $C_{64}$ | 1 |
| $C_{65}$ | 1 |
| $C_{66}$ | 1 |
| $C_{67}$ | 1 |
| $C_{68}$ | -1 |
| $C_{69}$ | -1 |
| $C_{70}$ | -1 |
| $C_{71}$ | 1 |
| $C_{72}$ | -1 |
| $C_{73}$ | -1 |
| $C_{74}$ | -1 |
| $C_{75}$ | -1 |
| $C_{76}$ | 1 |
| $C_{77}$ | 1 |
| $C_{78}$ | 1 |
| $C_{79}$ | -1 |
| $C_{80}$ | 1 |
| $C_{81}$ | 1 |
| $C_{82}$ | 1 |
| $C_{83}$ | 1 |
| $C_{84}$ | -1 |
| $C_{85}$ | -1 |
| $C_{86}$ | -1 |
| $C_{87}$ | 1 |
| $C_{88}$ | -1 |
| $C_{89}$ | 1 |
| $C_{90}$ | 1 |
| $C_{91}$ | 1 |
| $C_{92}$ | -1 |
| $C_{93}$ | -1 |
| $C_{94}$ | -1 |
| $C_{95}$ | 1 |
| $C_{96}$ | -1 |
| $C_{97}$ | -1 |
| $C_{98}$ | -1 |
| $C_{99}$ | -1 |
| $C_{100}$ | 1 |
| $C_{101}$ | 1 |
| $C_{102}$ | 1 |
| $C_{103}$ | -1 |
| $C_{104}$ | 1 |
| $C_{105}$ | 1 |
| $C_{106}$ | 1 |
| $C_{107}$ | 1 |
| $C_{108}$ | -1 |
| $C_{109}$ | -1 |
| $C_{110}$ | -1 |
| $C_{111}$ | 1 |
| $C_{112}$ | -1 |
| $C_{113}$ | -1 |
| $C_{114}$ | -1 |
| $C_{115}$ | -1 |
| $C_{116}$ | 1 |
| $C_{117}$ | 1 |
| $C_{118}$ | 1 |
| $C_{119}$ | -1 |
| $C_{120}$ | 1 |
| $C_{121}$ | -1 |
| $C_{122}$ | -1 |
| $C_{123}$ | -1 |
| $C_{124}$ | 1 |
| $C_{125}$ | 1 |
| $C_{126}$ | 1 |

-continued

| Sequence Element | Value |
| --- | --- |
| $C_{127}$ | -1 |
| $C_{128}$ | 1. |

9. The wireless device of claim 8, wherein the wireless device receives a first wireless orthogonal frequency division modulation transmission and a second wireless orthogonal frequency division modulation transmission and the correlator component is operable to calculate a first correlation of the preamble aligned with at least a portion of the first wireless orthogonal frequency division modulation transmission and a second correlation of the preamble aligned with at least a portion of the second wireless orthogonal frequency division modulation transmission, the one of the correlations having a greater value identified as associated with the wireless device.

10. A wireless device that distinguishes between multiple piconets, the wireless device comprising:
    a preamble component operable to provide a preamble for a wireless orthogonal frequency division modulation transmission; and
    a correlator component operable to distinguish a wireless transmission based on the preamble,
        wherein the preamble component reads the preamble out of a memory area, the preamble formed by transforming an ordered sequence of 128 bi-phase values to enhance a spectral energy density of the preamble, the 128 bi-phase values defined as proportional to:

| Sequence Element | Value |
| --- | --- |
| $C_1$ | 1 |
| $C_2$ | 1 |
| $C_3$ | 1 |
| $C_4$ | -1 |
| $C_5$ | -1 |
| $C_6$ | -1 |
| $C_7$ | 1 |
| $C_8$ | -1 |
| $C_9$ | 1 |
| $C_{10}$ | 1 |
| $C_{11}$ | 1 |
| $C_{12}$ | -1 |
| $C_{13}$ | -1 |
| $C_{14}$ | -1 |
| $C_{15}$ | 1 |
| $C_{16}$ | -1 |
| $C_{17}$ | 1 |
| $C_{18}$ | 1 |
| $C_{19}$ | 1 |
| $C_{20}$ | -1 |
| $C_{21}$ | -1 |
| $C_{22}$ | -1 |
| $C_{23}$ | 1 |
| $C_{24}$ | -1 |
| $C_{25}$ | -1 |
| $C_{26}$ | -1 |
| $C_{27}$ | -1 |
| $C_{28}$ | 1 |
| $C_{29}$ | 1 |
| $C_{30}$ | 1 |
| $C_{31}$ | -1 |
| $C_{32}$ | 1 |
| $C_{33}$ | 1 |
| $C_{34}$ | 1 |
| $C_{35}$ | 1 |
| $C_{36}$ | -1 |

-continued

| Sequence Element | Value |
| --- | --- |
| $C_{37}$ | -1 |
| $C_{38}$ | -1 |
| $C_{39}$ | 1 |
| $C_{40}$ | -1 |
| $C_{41}$ | 1 |
| $C_{42}$ | 1 |
| $C_{43}$ | 1 |
| $C_{44}$ | -1 |
| $C_{45}$ | -1 |
| $C_{46}$ | -1 |
| $C_{47}$ | 1 |
| $C_{48}$ | -1 |
| $C_{49}$ | 1 |
| $C_{50}$ | 1 |
| $C_{51}$ | 1 |
| $C_{52}$ | -1 |
| $C_{53}$ | -1 |
| $C_{54}$ | -1 |
| $C_{55}$ | 1 |
| $C_{56}$ | -1 |
| $C_{57}$ | -1 |
| $C_{58}$ | -1 |
| $C_{59}$ | -1 |
| $C_{60}$ | 1 |
| $C_{61}$ | 1 |
| $C_{62}$ | 1 |
| $C_{63}$ | -1 |
| $C_{64}$ | 1 |
| $C_{65}$ | 1 |
| $C_{66}$ | 1 |
| $C_{67}$ | 1 |
| $C_{68}$ | -1 |
| $C_{69}$ | -1 |
| $C_{70}$ | -1 |
| $C_{71}$ | 1 |
| $C_{72}$ | -1 |
| $C_{73}$ | -1 |
| $C_{74}$ | -1 |
| $C_{75}$ | -1 |
| $C_{76}$ | 1 |
| $C_{77}$ | 1 |
| $C_{78}$ | 1 |
| $C_{79}$ | -1 |
| $C_{80}$ | 1 |
| $C_{81}$ | 1 |
| $C_{82}$ | 1 |
| $C_{83}$ | 1 |
| $C_{84}$ | -1 |
| $C_{85}$ | -1 |
| $C_{86}$ | -1 |
| $C_{87}$ | 1 |
| $C_{88}$ | -1 |
| $C_{89}$ | 1 |
| $C_{90}$ | 1 |
| $C_{91}$ | 1 |
| $C_{92}$ | -1 |
| $C_{93}$ | -1 |
| $C_{94}$ | -1 |
| $C_{95}$ | 1 |
| $C_{96}$ | -1 |
| $C_{97}$ | -1 |
| $C_{98}$ | -1 |
| $C_{99}$ | -1 |
| $C_{100}$ | 1 |
| $C_{101}$ | 1 |
| $C_{102}$ | 1 |
| $C_{103}$ | -1 |
| $C_{104}$ | 1 |
| $C_{105}$ | 1 |
| $C_{106}$ | 1 |
| $C_{107}$ | 1 |
| $C_{108}$ | -1 |
| $C_{109}$ | -1 |
| $C_{110}$ | -1 |
| $C_{111}$ | 1 |
| $C_{112}$ | -1 |
| $C_{113}$ | -1 |
| $C_{114}$ | -1 |
| $C_{115}$ | -1 |
| $C_{116}$ | 1 |
| $C_{117}$ | 1 |
| $C_{118}$ | 1 |
| $C_{119}$ | -1 |
| $C_{120}$ | 1 |
| $C_{121}$ | -1 |
| $C_{122}$ | -1 |
| $C_{123}$ | -1 |
| $C_{124}$ | 1 |
| $C_{125}$ | 1 |
| $C_{126}$ | 1 |
| $C_{127}$ | -1 |
| $C_{128}$ | 1. |

11. A wireless device that distinguishes between multiple piconets, the wireless device comprising:
a preamble component operable to provide a preamble for a wireless orthogonal frequency division modulation transmission; and
a correlator component operable to distinguish a wireless transmission based on the preamble,
wherein the preamble component reads the preamble out of a memory area, the preamble further defined as proportional to the following ordered sequence of 128 values:

| Sequence Element | Value |
| --- | --- |
| $C'_1$ | 0.9574 |
| $C'_2$ | 0.5270 |
| $C'_3$ | 1.5929 |
| $C'_4$ | -0.2500 |
| $C'_5$ | -0.2536 |
| $C'_6$ | -0.3023 |
| $C'_7$ | 1.2907 |
| $C'_8$ | -0.4258 |
| $C'_9$ | 1.0012 |
| $C'_{10}$ | 1.7704 |
| $C'_{11}$ | 0.8593 |
| $C'_{12}$ | -0.3719 |
| $C'_{13}$ | -1.3465 |
| $C'_{14}$ | -0.7419 |
| $C'_{15}$ | 1.5350 |
| $C'_{16}$ | -1.2180 |
| $C'_{17}$ | 0.6955 |
| $C'_{18}$ | 1.7204 |
| $C'_{19}$ | 0.1643 |
| $C'_{20}$ | -0.3347 |
| $C'_{21}$ | -1.7244 |
| $C'_{22}$ | -0.7447 |
| $C'_{23}$ | 1.1141 |
| $C'_{24}$ | -1.3541 |
| $C'_{25}$ | -0.7293 |
| $C'_{26}$ | 0.2682 |
| $C'_{27}$ | -1.2401 |
| $C'_{28}$ | 1.0527 |
| $C'_{29}$ | 0.1199 |
| $C'_{30}$ | 1.1496 |
| $C'_{31}$ | -1.0544 |
| $C'_{32}$ | 1.3176 |
| $C'_{33}$ | 0.8400 |
| $C'_{34}$ | 1.3980 |
| $C'_{35}$ | 1.1147 |
| $C'_{36}$ | -0.4732 |
| $C'_{37}$ | -1.7178 |
| $C'_{38}$ | -0.8477 |
| $C'_{39}$ | 1.5083 |
| $C'_{40}$ | -1.4364 |
| $C'_{41}$ | 0.3853 |

-continued

| Sequence Element | Value |
|---|---|
| $C'_{42}$ | 1.5673 |
| $C'_{43}$ | 0.0295 |
| $C'_{44}$ | −0.4204 |
| $C'_{45}$ | −1.4856 |
| $C'_{46}$ | −0.8404 |
| $C'_{47}$ | 1.0111 |
| $C'_{48}$ | −1.4269 |
| $C'_{49}$ | 0.3033 |
| $C'_{50}$ | 0.7757 |
| $C'_{51}$ | −0.1370 |
| $C'_{52}$ | −0.5250 |
| $C'_{53}$ | −1.1589 |
| $C'_{54}$ | −0.8324 |
| $C'_{55}$ | 0.6336 |
| $C'_{56}$ | −1.2698 |
| $C'_{57}$ | −0.7853 |
| $C'_{58}$ | −0.7031 |
| $C'_{59}$ | −1.1106 |
| $C'_{60}$ | 0.6071 |
| $C'_{61}$ | 0.7164 |
| $C'_{62}$ | 0.8305 |
| $C'_{63}$ | −1.2355 |
| $C'_{64}$ | 1.1754 |
| $C'_{65}$ | 0.5859 |
| $C'_{66}$ | 0.3053 |
| $C'_{67}$ | 0.2408 |
| $C'_{68}$ | −0.6744 |
| $C'_{69}$ | −0.2361 |
| $C'_{70}$ | −0.8133 |
| $C'_{71}$ | 0.9201 |
| $C'_{72}$ | −1.0841 |
| $C'_{73}$ | −0.8036 |
| $C'_{74}$ | −0.3105 |
| $C'_{75}$ | −1.0514 |
| $C'_{76}$ | 0.7644 |
| $C'_{77}$ | 0.7301 |
| $C'_{78}$ | 0.9788 |
| $C'_{79}$ | −1.1305 |
| $C'_{80}$ | 1.3257 |
| $C'_{81}$ | 0.7801 |
| $C'_{82}$ | 0.7867 |
| $C'_{83}$ | 1.0996 |
| $C'_{84}$ | −0.5623 |
| $C'_{85}$ | −1.2227 |
| $C'_{86}$ | −0.8223 |
| $C'_{87}$ | 1.2074 |
| $C'_{88}$ | −1.2338 |
| $C'_{89}$ | 0.2957 |
| $C'_{90}$ | 1.0999 |
| $C'_{91}$ | −0.0201 |
| $C'_{92}$ | −0.5194 |
| $C'_{93}$ | −1.2284 |
| $C'_{94}$ | −0.9215 |

-continued

| Sequence Element | Value |
|---|---|
| $C'_{95}$ | 0.7941 |
| $C'_{96}$ | −1.4128 |
| $C'_{97}$ | −0.8528 |
| $C'_{98}$ | −0.6973 |
| $C'_{99}$ | −1.2477 |
| $C'_{100}$ | 0.6246 |
| $C'_{101}$ | 0.7687 |
| $C'_{102}$ | 0.7966 |
| $C'_{103}$ | −1.2809 |
| $C'_{104}$ | 1.1023 |
| $C'_{105}$ | 0.4250 |
| $C'_{106}$ | −0.1614 |
| $C'_{107}$ | 0.7547 |
| $C'_{108}$ | −0.6696 |
| $C'_{109}$ | −0.3920 |
| $C'_{110}$ | −0.7589 |
| $C'_{111}$ | 0.6701 |
| $C'_{112}$ | −0.9381 |
| $C'_{113}$ | −0.7483 |
| $C'_{114}$ | −0.9659 |
| $C'_{115}$ | −0.9192 |
| $C'_{116}$ | 0.3925 |
| $C'_{117}$ | 1.2864 |
| $C'_{118}$ | 0.6784 |
| $C'_{119}$ | −1.0909 |
| $C'_{120}$ | 1.1140 |
| $C'_{121}$ | −0.6134 |
| $C'_{122}$ | −1.5467 |
| $C'_{123}$ | −0.3031 |
| $C'_{124}$ | 0.9457 |
| $C'_{125}$ | 1.9645 |
| $C'_{126}$ | 1.4549 |
| $C'_{127}$ | −1.2760 |
| $C'_{128}$ | 2.2102. |

12. A wireless device that distinguishes between multiple piconets, the wireless device comprising:

a preamble component operable to provide a preamble for a wireless orthogonal frequency division modulation transmission; and a correlator component operable to distinguish a wireless transmission based on the preamble, wherein the preamble component forms the preamble as a 128-length sequence by spreading a first sequence of 16 ordered bi-phase values with a second sequence of 8 ordered bi-phase values, the first sequence specified as proportional to:

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | −1 | 1 | 1 | 1 | −1 | 1 | −1 | 1 | 1 | −1 | 1 | −1 | −1 | and the second sequence specified as proportional to:

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1. |

13. A wireless device that distinguishes between multiple piconets, the wireless device comprising:

a preamble component operable to provide a preamble for a wireless orthogonal frequency division modulation transmission; and a correlator component operable to distinguish a wireless transmission based on the preamble, wherein the correlator component comprises a first spreader and a second spreader, and distinguishes the wireless transmission containing the preamble by spreading at least a portion of the wireless transmission with a first sequence of ordered bi-phase values through the first spreader, and by spreading the output of the first spreader with a second sequence of ordered bi-phase values through the second spreader, the output of the second spreader providing an indication of the presence of the preamble in the wireless transmission, the first sequence specified as proportional to:

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1 | and the second sequence specified as proportional to:

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | −1 | 1 | 1 | 1 | −1 | 1 | −1 | 1 | 1 | −1 | 1 | −1 | −1. |

14. A method for determining a K-length wireless message preamble for a fixed frequency interleaving piconet, comprising:

identifying K-length hierarchical sequences having a zero mean;

identifying K-length hierarchical sequences having first side lobes of an autocorrelation less than a first threshold;

calculating a cross-correlation for K-length hierarchical sequences with other time frequency interleaved preambles; and selecting a K-length hierarchical sequence having the autocorrelation greater than a second threshold, a cross-correlation with other time frequency interleaved preambles less than a third threshold, zero mean, and first side lobes of the autocorrelation less than the first threshold.

15. The method of claim 14, wherein the first threshold is about −4 dB, the second threshold is about −2 dB, and the third threshold is about −4 dB.

16. The method of claim 14, wherein the selecting is based partially on the K-length hierarchical sequence having first side lobes of the autocorrelation less than about −13 dB and a cross-correlation less than about −7 dB with other time frequency interleaved preambles.

17. The method of claim 14, wherein the value of K is 128.

18. A circuit for a wireless transmitter, the circuit comprising:

a spreader to spread a first sequence with a second sequence to generate a 128-length sequence, the first sequence selected from one of an 8-length sequence and a 16-length sequence, the second sequence selected from the other of the 16-length sequence and the 8-length sequence, wherein the 8-length sequence is proportional to:

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1 | and the 16-length sequence is proportional to:

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | −1 | 1 | 1 | 1 | −1 | 1 | −1 | 1 | 1 | −1 | 1 | −1 | −1. | and wherein the wireless transmitter transmits a message containing a 128-length orthogonal frequency division modulation preamble based on the 128-length sequence.

19. The circuit of claim 18, further including:

a fast Fourier transformer operable to transform the 128-length sequence into a frequency domain representation;

a frequency shaper operable to adjust the spectral characteristics of the frequency domain representation to produce a spectrally adjusted frequency domain representation; and an inverse fast Fourier transformer operable to transform the spectrally adjusted frequency domain representation to a time domain spectrally adjusted 128-length sequence, wherein the 128-length orthogonal frequency division modulation preamble is formed from the time domain spectrally adjusted 128-length sequence.

20. The circuit of claim 19, wherein the frequency shaper is operable to adjust the spectral characteristics of the frequency domain representation to adapt the 128-length orthogonal frequency division modulation preamble based on the wireless communication channel conditions.

* * * * *